(12) United States Patent
Easterbrook

(10) Patent No.: US 9,302,542 B2
(45) Date of Patent: Apr. 5, 2016

(54) LOAD BEARING AND SPRING LOADED QUICK ATTACHMENT ARM FOR USE WITH A VEHICLE HOIST

(71) Applicant: David J. Easterbrook, Troy, MI (US)

(72) Inventor: David J. Easterbrook, Troy, MI (US)

( * ) Notice: Subject to any disclaimer, the term of this patent is extended or adjusted under 35 U.S.C. 154(b) by 174 days.

(21) Appl. No.: 14/148,128

(22) Filed: Jan. 6, 2014

(65) Prior Publication Data
US 2014/0284441 A1    Sep. 25, 2014

Related U.S. Application Data

(60) Provisional application No. 61/804,419, filed on Mar. 22, 2013.

(51) Int. Cl.
| | |
|---|---|
| F16M 13/02 | (2006.01) |
| A47G 29/00 | (2006.01) |
| B60B 30/00 | (2006.01) |
| A47B 96/06 | (2006.01) |
| A47F 5/05 | (2006.01) |
| A47G 7/04 | (2006.01) |
| G09F 17/00 | (2006.01) |

(52) U.S. Cl.
CPC .............. *B60B 30/00* (2013.01); *A47B 96/061* (2013.01); *A47F 5/05* (2013.01); *A47G 7/045* (2013.01); *B60B 2900/351* (2013.01); *F16M 13/02* (2013.01); *G09F 17/00* (2013.01)

(58) Field of Classification Search
CPC ......... G09F 17/00; A47F 5/05; A47B 96/061; A47G 7/045; A47G 29/00; F16M 13/02
USPC ................. 248/125.1, 218.4, 226.11, 231.61, 248/230.1; 414/462, 463, 465, 466; 187/203, 216; 116/173, 174
See application file for complete search history.

(56) References Cited

U.S. PATENT DOCUMENTS

| | | | | |
|---|---|---|---|---|
| 1,541,129 | A * | 6/1925 | Farley ..................... | F16L 3/18 248/55 |
| 3,888,354 | A * | 6/1975 | Margolin .................. | A47F 5/05 248/231.61 |
| 4,479,625 | A * | 10/1984 | Martz ..................... | F16L 3/127 248/62 |
| 6,547,197 | B2 * | 4/2003 | Kempf .................. | A47B 96/061 248/125.1 |
| 6,604,610 | B2 | 8/2003 | Starling et al. | |
| 6,681,897 | B2 | 1/2004 | Gibson et al. | |
| 6,752,365 | B2 * | 6/2004 | Vanech .................. | A47G 7/045 248/218.4 |
| 6,923,141 | B1 * | 8/2005 | Staats ..................... | G09F 17/00 248/121 |
| 7,073,778 | B2 | 7/2006 | Gibson et al. | |
| 7,231,884 | B1 * | 6/2007 | Rang ..................... | G09F 17/00 116/173 |
| 7,815,158 | B2 | 10/2010 | Henderson | |
| 8,245,991 | B2 | 8/2012 | Hung | |
| 2002/0003196 | A1 | 1/2002 | Gibson et al. | |
| 2003/0155475 | A1 | 8/2003 | Hicks | |
| 2009/0067966 | A1 | 3/2009 | Hicks | |
| 2012/0079769 | A1 | 4/2012 | Krause | |
| 2013/0240696 | A1 * | 9/2013 | Black ........................ | B66F 7/28 248/226.11 |
| 2014/0284441 | A1 * | 9/2014 | Easterbrook ............ | B60B 30/00 248/231.61 |

* cited by examiner

*Primary Examiner* — Tan Le
(74) *Attorney, Agent, or Firm* — Dinsmore & Shohl LLP; Douglas J. McEvoy

(57) ABSTRACT

A quick attachment arm for securing to an elevated and structurally supporting location. A multi-sided and compressible band is constructed of a spring-loaded material. The band is open at its outer end and adapted to permit the band to be attached around a perimeter of the supporting location. An elongated arm is pivotally supported to and extending from the band, the arm adapted to supporting a weighted article placed thereupon.

16 Claims, 5 Drawing Sheets

LOAD BEARING AND SPRING LOADED QUICK ATTACHMENT ARM FOR USE WITH A VEHICLE HOIST

CROSS REFERENCE TO RELATED APPLICATIONS

The present application claims priority from U.S. Ser. No. 61/804,419 filed Mar. 22, 2013, the contents of which are incorporated herein in its entirety.

FIELD OF THE INVENTION

The present invention discloses a spring loaded quick attachment arm for engagement to a structurally supporting location, not limited to a tubular location associated with a vehicle hoist. A base attachment portion is configured as a biasing and compressible band. A remote extending and threaded bolt is supported upon a first extending end portion of the attachment band. An aligning and engaging second end portion of the band includes an aperture which, upon compressing the band, seats therethrough the threaded shaft, following which a nut is exteriorly attached and tightened over the projecting end of the shaft.

The attachment arm is pivotally supported to the base attachment portion and can exhibit load supporting capabilities of up to several hundred pounds, thus enabling the placement of heavy objects not limited to a combined weight of a vehicle tire and wheel and such as during repair or maintenance being conducted to the vehicle brakes, axle or the like. A collection cup or other volumetric defining component can be attached to or suspended from the arm and provides a convenient location for depositing and securely retaining lug nuts associated with the removed and supported wheel.

DESCRIPTION OF THE BACKGROUND ART

The prior art is documented with examples of hoist mounted wheel hangers, and such as for hanging a wheel on a hoist arm. A first example of this is set forth in Henderson, U.S. Pat. No. 7,815,158 which teaches a double hinged and hoist mounted wheel hanger including a rigid clevis having top, bottom and base plates arranged in an integral "U" shape and such that a first hinge bolt passes through the top and bottom plates for supporting an arm connector. A second hinge bolt passes through the arm connector and in turn hingedly supports a further extending and pivotally support rod, upon an end of which is exhibited a retainer pin for supporting a wheel and preventing the same from slipping off the arm.

Hicks US 2003/0155475 and US 2009/0067966 each teaches a hoist tire hanger with an angled bracket configuration for vertically attaching to a horizontal tubular hoist location and which depicts an upwardly angled tire hanging section. Reference is also made to the pivoting support bracket designs of Gibson US 2002/003196 and the supporting arm of Hung 8,245,991.

SUMMARY OF THE PRESENT INVENTION

The present invention discloses a quick attachment arm for securing to an elevated and structurally supporting location. A multi-sided and compressible band is constructed of a spring-loaded material, the multi-sided band being open at its outer end and adapted to permit the band to be attached around a perimeter of the supporting location. An elongated arm is pivotally supported to and extending from the band and is in turn adapted to support a weighted article placed thereupon.

Other features include the band exhibiting a generally four-sided configuration with a base, a first angularly extending upper side and second opposite and angularly extending lower side. The upper side extends into a further curved outer and upper portion terminating in an extending end portion, with the lower side likewise extending into a further curved outer and lower portion terminating in an extending end portion which is a spaced distance below the upper extending portion.

A remote extending and threaded bolt exhibits a threaded shaft and is supported, via an enlarged head, in extending fashion upon the lower extending end portion of the band. The upper aligning and engaging second end portion of the band further including an aperture which, upon compressing the band so that an outward bias of the upper side is counteracted and caused to pivot downwardly, subsequently seats the threaded shaft through the aperture. A nut is exteriorly attached and tightened over a projecting end of the shaft to a degree necessary to draw together and tighten the band around and against the structurally supporting location.

Additional features include a pair of planar brackets extending outwardly from opposite and exterior sides of the base surface of the band, a second heavy duty bolt including a shaft and an enlarged head which is seated in cross wise extending fashion through aligning apertures associated with the brackets. The arm may also include a reinforced cylindrical end support through which the shaft of the second bolt extends and upon the same being aligned between the brackets so that a second nut is attached over a projecting end of the second shaft and tightened against a selected bracket.

Other features include a second washer located at an exterior face of a further and other selected bracket, with additional washers located between outer ends of the cylindrical support and inner faces of the brackets in order to provide structural support and ease of rotation to the arm. A nylon sleeve is placed over the arm, such as in order to facilitate such as smooth sliding placement and removal of the weighted article. Yet additional features include a volumetric defining and cup shaped component attached to or suspended from the arm to provide for depositing and securely retaining lug nuts associated with a weighted article in the form of a removed and supported wheel.

BRIEF DESCRIPTION OF THE DRAWINGS

Reference will now be had to the attached drawings, when read in combination with the following detailed description, wherein like reference numerals refer to like parts throughout the several views, and in which.

DETAILED DESCRIPTION OF THE PREFERRED EMBODIMENTS

Figure 1:
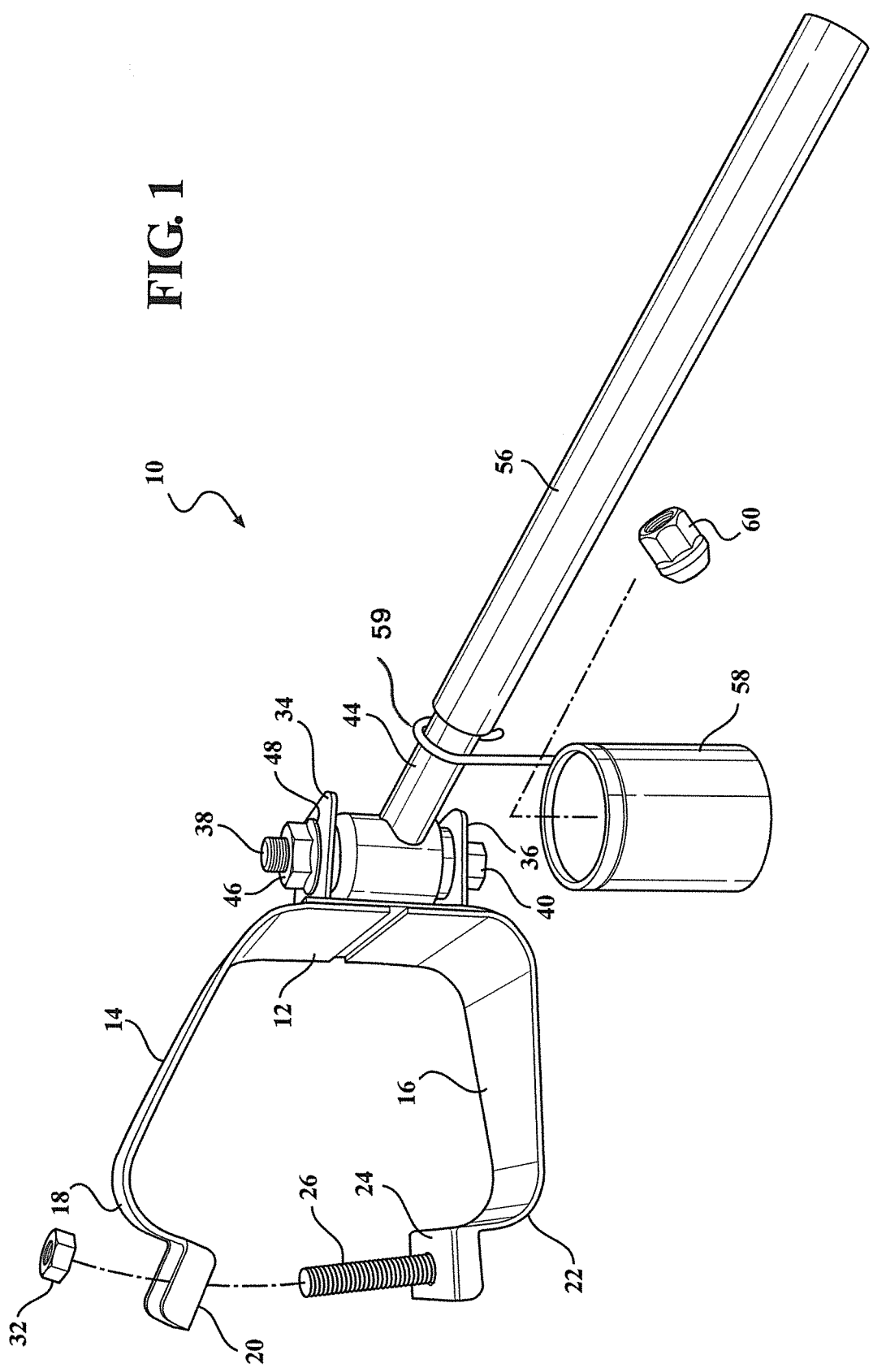
FIG. 1 is a first perspective view of the load bearing and spring loaded quick attachment arm according to one non-limiting variant of the present invention and illustrating the spring loaded attachment band in a first open position.
Figure 2:
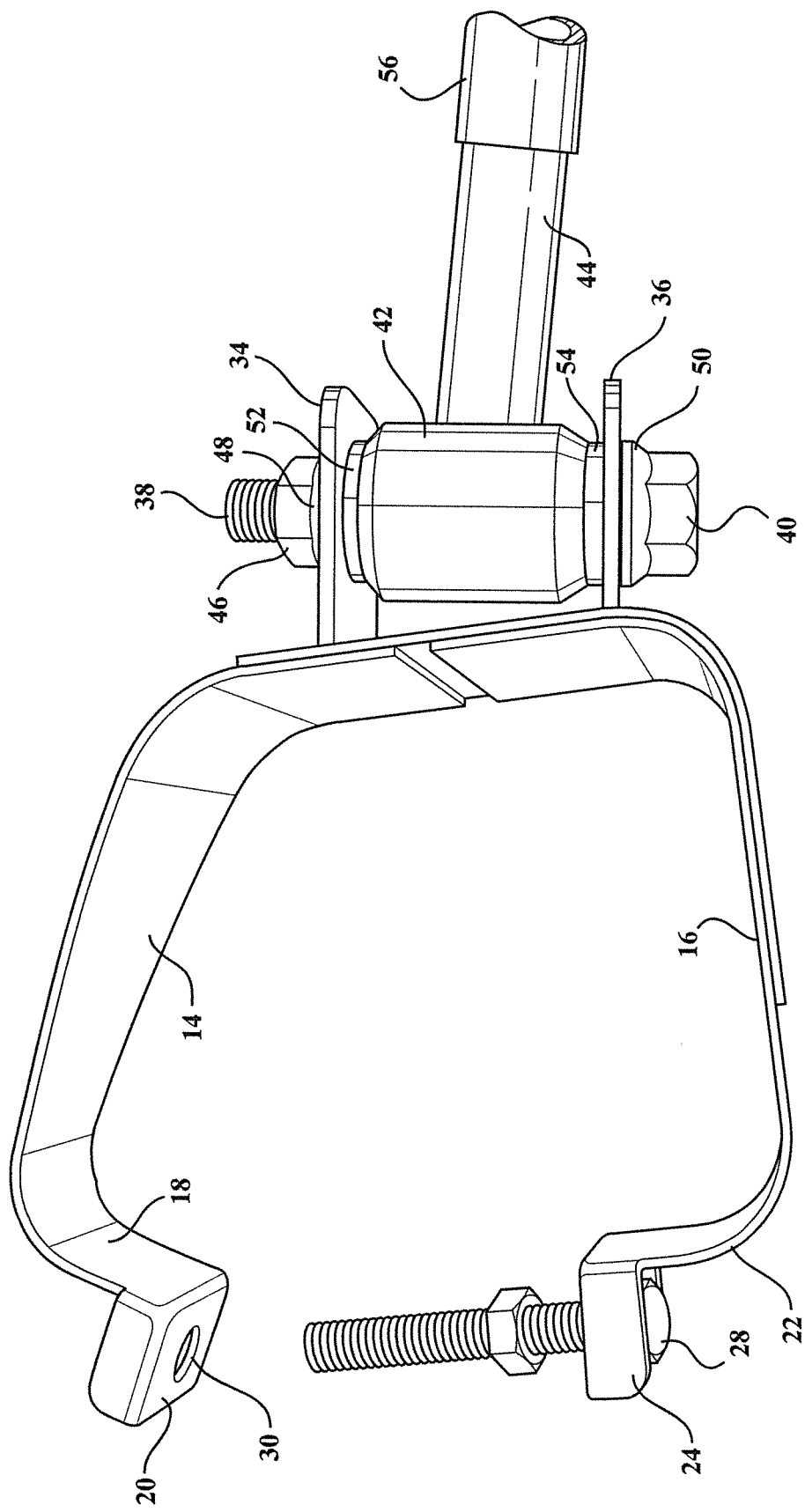
FIG. 2 is an enlarged view illustrating both the spring loaded attachment band as well as the heavy duty nature of the pivotal support established between the attachment band and the arm.
Figure 3:
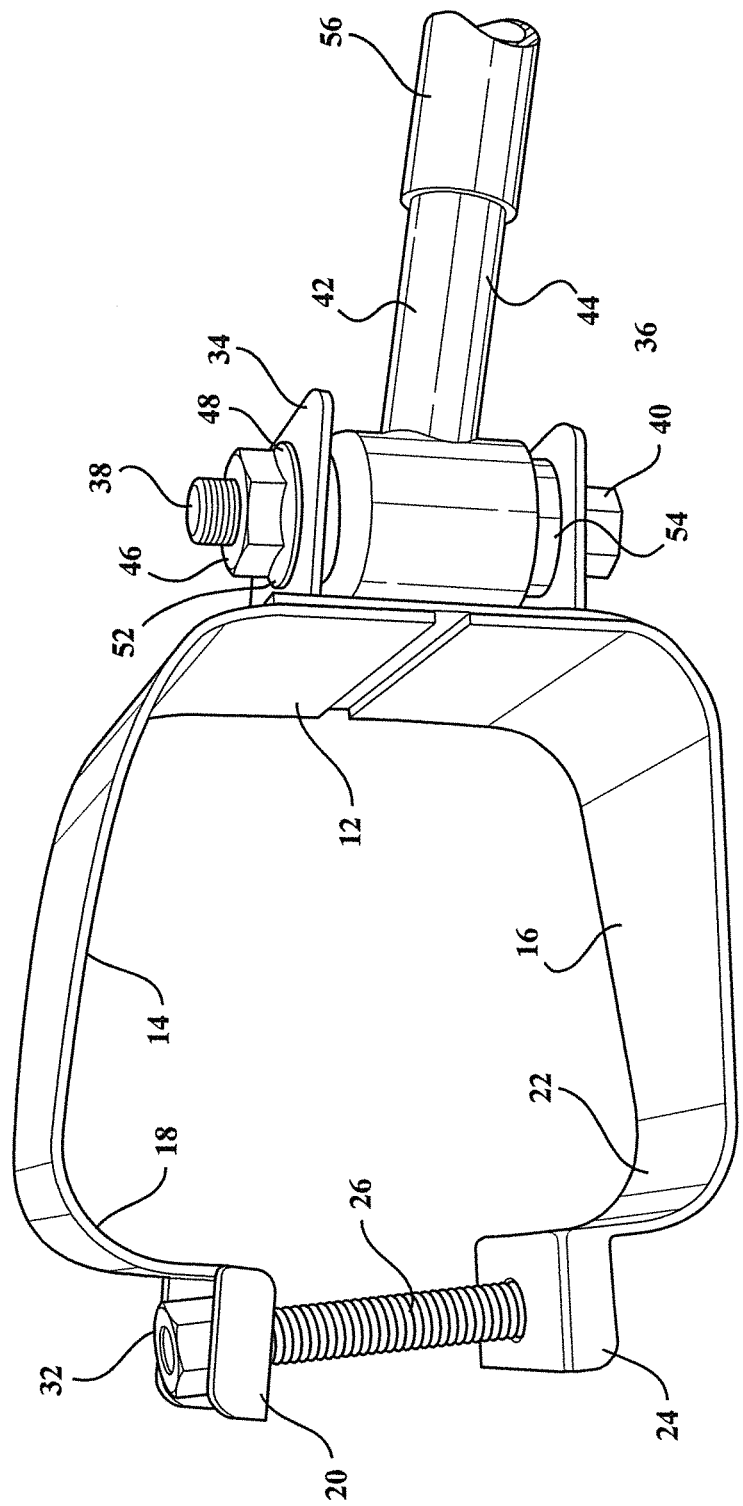
FIG. 3 is a succeeding illustration to FIG. 2 and depicting the compressing of the spring biased band, including the second extending end seating therethrough the threaded shaft, following which a nut is exteriorly attached and tightened over the projecting end of the shaft.
Figure 4:
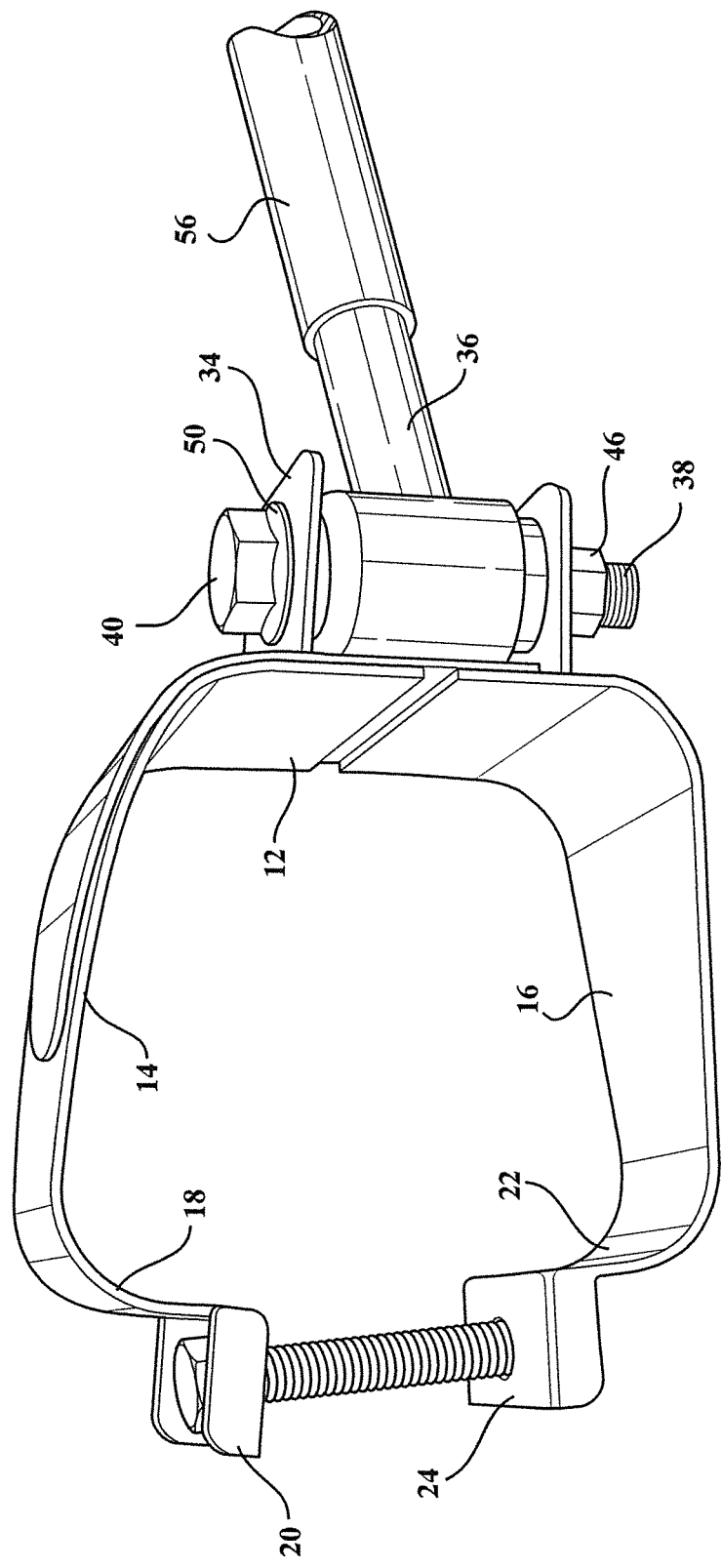
FIG. 4 is another assembled depiction of the attachment band.
Figure 5:
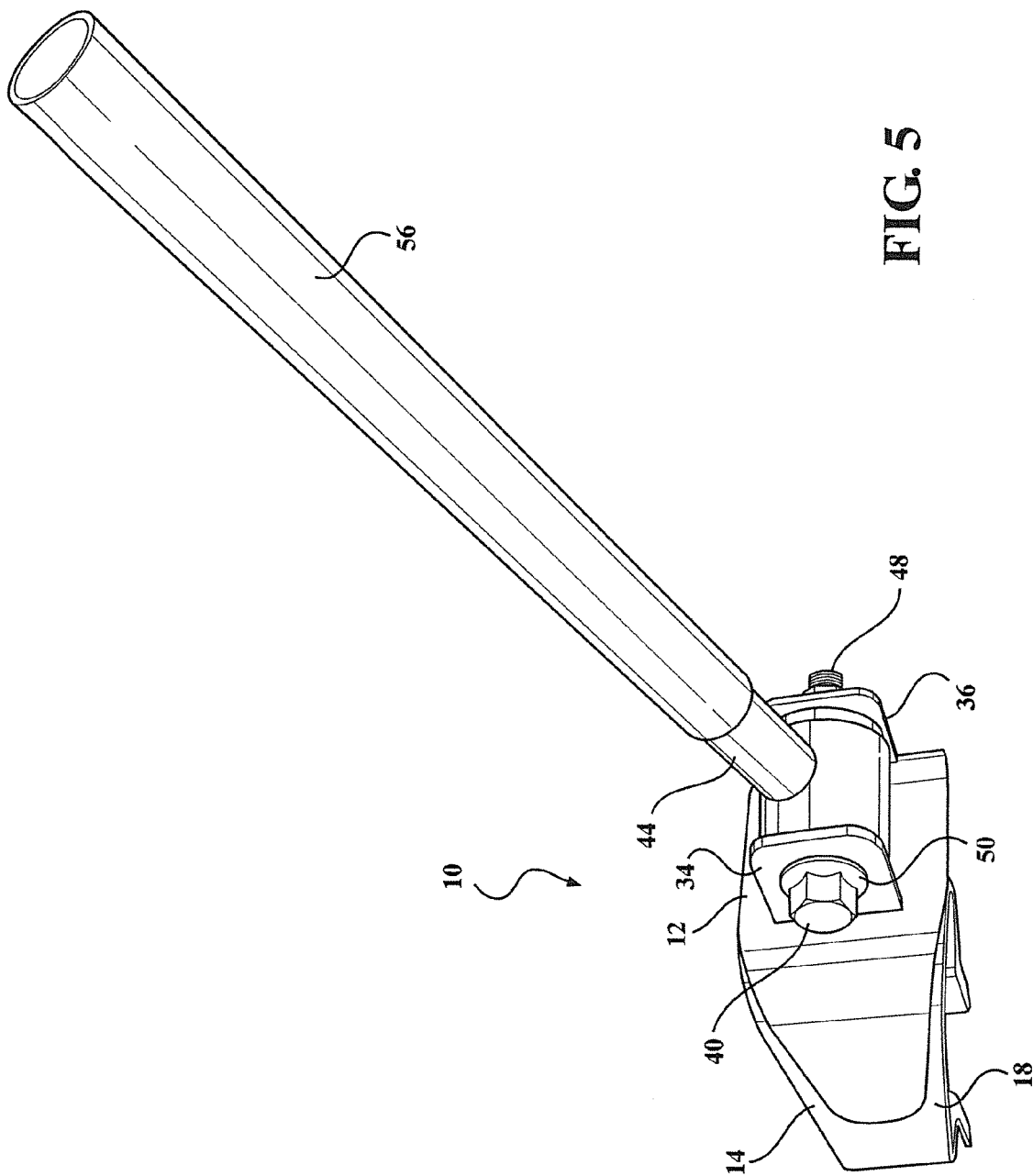
FIG. 5 is a further perspective view illustrating in particular the configuration and dimension of the elongated and pivotal load supporting arm.

Referring to each of FIGS. 1-5, a spring loaded quick attachment arm is generally depicted at 10 for engagement to a structurally supporting location, such as not limited to a tubular location (not shown) associated with a vehicle hoist. As will be further described, the attachment arm is capable of being redesigned in a number of differing and unlimited configurations and for providing load bearing support to objects placed thereupon, such as again including but not limited to support a tire from its inner rim or wheel location.

A base attachment portion is shown and is configured as a biasing and compressible band exhibiting a generally four-sided configuration with a base 12, first angularly extending upper side 14 and second opposite and angularly extending lower side 16. The upper side 14 extends into a further curved outer and upper portion 18 terminating in an extending end portion 20, with the lower side 16 likewise extending into a further curved outer and lower portion 22 terminating in an extending end portion 24 which is a spaced distance below the upper extending portion 20.

The sides 12, 14 and 16, in combination with outer side portions 18 and 22, collectively define the multi-sided band which is open at its outer end and is adapted to permit the band to be biasingly or flexurally attached around a perimeter location (again not shown) associated with the vehicle lift frame. While not limited to any specific material construction or dimensions it is understood that the band, such as constructed of a heavy duty spring steel or like material, and which exhibit a suitable length, width and thickness in order to engage around and subsequently draw down against a lift frame location such as which can exhibit a 4.25"×4.25" standard cross section. It is also envisioned and understood that the spring loaded band or clamp can be redesigned to exhibit any other integrally extending configuration which facilitates quick attach/detach capabilities relative to the vehicle lift or like supporting surface.

A remote extending and threaded bolt exhibiting a threaded shaft 26 is supported, via an enlarged head 28 (FIG. 2) in extending fashion upon the lower extending end portion 24 of the attachment band. The upper aligning and engaging second end portion 20 of the band includes an aperture (see closed perimeter defined surface 30) which, upon compressing the band so that the outward bias of the upper side 14 is counteracted and caused to pivot downwardly, subsequently seats the threaded shaft 26 through the aperture 30. As further depicted in FIG. 3, and following forced compressive alignment and insertion of the shaft end 26 through the upper end aperture 30, a nut 32 is exteriorly attached and tightened over the projecting end of the shaft to a degree necessary to counteract the expanding bias exerted by the four sided spring shaped body and to draw together and tighten the spring loaded band around and against the perimeter of the lift location.

A pair of planar brackets 34 and 36 extend outwardly from opposite and exterior sides of the base surface 12 of the spring loaded band. A second heavy duty bolt, including shaft 38 and enlarged head 40, is seated in cross wise extending fashion through aligning apertures (not shown) associated with the brackets 34 and 36.

A reinforced cylindrical end support 42 is associated with an extending support arm 44. The shaft 38 extends through the cylindrical support 42, upon the same being aligned between the brackets 34 and 36 and so that a second nut 46 (with washer 48) is attached over the end of the shaft 38 and tightened against the upper bracket 34. As shown in each of FIG. 2 and the reversed view of FIG. 5, a second washer 50 can also be located at an exterior face of the lower bracket 36 and it is further envisioned that additional washers 52 and 54 can be located between the outer ends of the cylindrical support 42 and inner faces of the brackets 34 and 36 in order to provide structural support and ease of rotation to the arm 44.

In this fashion, the attachment arm 44 is pivotally supported to the base attachment portion and can exhibit load supporting capabilities of up to several hundred pounds, thus enabling the placement of heavy objects (not shown) such as including, but not limited to, a combined weight of a vehicle tire and wheel such as during repair or maintenance being conducted to the vehicle brakes, axle or the like.

Additional features include a nylon sleeve 56 which can be placed over the underlying (metal) arm 44 and in order to facilitate such as smooth sliding placement and removal of the wheel via its inner rim. As further depicted in FIG. 1, a collection cup 58 or other volumetric defining component can be attached to or suspended from the arm 44 (such as at an inner end location proximate its cylindrical end 42 and as further referenced by an upwardly extending and looped clip engaging arm 59) to provide a convenient location for depositing and securely retaining lug nuts (also at 60) associated with the removed and supported wheel.

Having described my invention, other and additional preferred embodiments will become apparent to those skilled in the art to which it pertains, and without deviating from the scope of the appended claims.

I claim:

1. A quick attachment arm for securing to an elevated and structurally supporting location, comprising:

a multi-sided and compressible band constructed of a spring-loaded material, said band further having a generally four-sided configuration with a base, a first angularly extending upper side and second opposite and angularly extending lower side, said upper side extending into a further curved outer and upper portion terminating in an upper extending end portion, said lower side likewise extending into a further curved outer and lower portion terminating in a lower extending end portion which is a spaced distance below said upper extending portion, the multi-sided band being open at its outer end and adapted to permit the band to be attached around a perimeter of the supporting location;

a remote extending and threaded bolt exhibiting a threaded shaft and supported, via an enlarged head, in extending fashion upon said lower extending end portion of said band, said upper aligning and upper engaging end portion of said band including an aperture which, upon compressing said band so that an outward bias of the upper side is counteracted and caused to pivot downwardly, subsequently seating said threaded shaft through said aperture, a nut being exteriorly attached and tightened over a projecting end of said shaft to a degree necessary to draw together and tighten said band around and against the structurally supporting location;

a pair of planar brackets extending outwardly from opposite and exterior sides of said base of said band, a second heavy duty bolt including a shaft and an enlarged head which is seated in cross wise extending fashion through aligning apertures associated with said brackets; and an elongated arm pivotally supported between said planar brackets by said second bolt and extending from said band, said arm adapted to support a weighted article placed thereupon.

2. The invention as described in claim 1, said arm further comprising a reinforced cylindrical end support through which said shaft of said second bolt extends and upon the same being aligned between said brackets so that a second nut is attached over a projecting end of said second shaft and tightened against a selected bracket.

3. The invention as described in claim 2, further comprising a second washer located at an exterior face of a further and other selected bracket.

4. The invention as described in claim 3, further comprising additional washers located between outer ends of said cylindrical support and inner faces of said brackets in order to provide structural support and ease of rotation to said arm.

5. The invention as described in claim 1, further comprising a nylon sleeve placed over said arm, such as in order to facilitate such as smooth sliding placement and removal of the weighted article.

6. The invention as described in claim 1, further comprising a volumetric defining and cup shaped component attached to or suspended from said arm to provide for depositing and securely retaining lug nuts associated with a weighted article in the form of a removed and supported wheel.

7. A quick attachment arm for securing to an elevated and structurally supporting location, comprising:
a one piece multi-sided and compressible band constructed of a spring-loaded material, the multi-sided band being open at its outer end and adapted to permit the band to be attached around a perimeter of the supporting location;
said band further having a generally four-sided configuration with a base, a first angularly extending upper side and second opposite and angularly extending lower side;
said upper side extending into a further curved outer and upper portion terminating in an upper extending end portion, said lower side likewise extending into a further curved outer and lower portion terminating in a lower extending end portion which is a spaced distance below said upper extending end portion;
a fastener installed upon a selected one of said extending end portions and, upon compressing said extending end portions against its spring bias and in directions towards one another, said fastener engaging the other selected extending end portion in order to secure said band about the structurally supporting location;
a pair of planar brackets extending outwardly from opposite and exterior sides of said base surface of said band, a pivotally supported component extending between said planar brackets; and
an elongated arm pivotally supported between said planar brackets by said component and extending from said band, said arm adapted to support a weighted article placed thereupon.

8. The invention as described in claim 7, said fastener further comprising a remote extending and threaded bolt exhibiting a threaded shaft and supported, via an enlarged head, in extending fashion upon said lower extending end portion of said band, said upper aligning and engaging end portion of said band including an aperture which, upon compressing said band so that an outward bias of the upper side is counteracted and caused to pivot downwardly, subsequently seating said threaded shaft through said aperture, a nut being exteriorly attached and tightened over a projecting end of said shaft to a degree necessary to draw together and tighten said band around and against the structurally supporting location.

9. The invention as described in claim 8, said pivotally supported component further comprising a heavy duty bolt including a second shaft and an enlarged head which is seated in cross wise extending fashion through aligning apertures associated with said brackets.

10. The invention as described in claim 9, said arm further comprising a reinforced cylindrical end support through which said second shaft of said heavy duty bolt extends and upon the same being aligned between said brackets so that a second nut is attached over a projecting end of said second shaft and tightened against a selected bracket.

11. The invention as described in claim 10, further comprising a second washer located at an exterior face of a further and other selected bracket.

12. The invention as described in claim 11, further comprising additional washers located between outer ends of said cylindrical support and inner faces of said brackets in order to provide structural support and ease of rotation to said arm.

13. The invention as described in claim 7, further comprising a nylon sleeve placed over said arm, such as in order to facilitate such as smooth sliding placement and removal of the weighted article.

14. The invention as described in claim 7, further comprising a volumetric defining and cup shaped component attached to or suspended from said arm to provide for depositing and securely retaining lug nuts associated with a weighted article in the form of a removed and supported wheel.

15. A quick attachment arm for securing to an elevated and structurally supporting location, comprising:
a one piece multi-sided and compressible band constructed of a spring-loaded material, the multi-sided band being open at its outer end and adapted to permit the band to be attached around a perimeter of the supporting location;
said band further having a generally four-sided configuration with a base, a first angularly extending upper side and second opposite and angularly extending lower side;
said upper side extending into a further curved outer and upper portion terminating in an upper extending end portion, said lower side likewise extending into a further curved outer and lower portion terminating in a lower extending end portion which is a spaced distance below said upper extending end portion;
a fastener installed upon a selected one of said extending end portions and, upon compressing said extending end portions against its spring bias and in directions towards one another, said fastener engaging the other selected extending portion in order to secure said band about the structurally supporting location;
a pair of planar brackets extending outwardly from opposite and exterior sides of said base surface of said band, a pivotally supported component extending between said planar brackets;
an elongated arm pivotally supported between said planar brackets by said component and extending from said band, said arm adapted to support a weighted article placed thereupon;
a nylon sleeve placed over said arm, such as in order to facilitate such as smooth sliding placement and removal of the weighted article.

16. The invention as described in claim 15, further comprising a volumetric defining and cup shaped component attached to or suspended from said arm to provide for depositing and securely retaining lug nuts associated with a weighted article in the form of a removed and supported wheel.

* * * * *